United States Patent [19]

Rosenthal

[11] 4,052,102
[45] Oct. 4, 1977

[54] FOLDING SEAT ASSEMBLY

[76] Inventor: Lester P. Rosenthal, 7719 Lake St., Omaha, Nebr. 68164

[21] Appl. No.: 689,195

[22] Filed: May 24, 1976

[51] Int. Cl.$^2$ .............................................. B60N 1/04
[52] U.S. Cl. .................................. 297/334; 297/341; 248/398
[58] Field of Search .............. 248/395, 397, 398, 371, 248/382, 384; 297/326, 325, 329, 334, 341; 108/12

[56] References Cited

U.S. PATENT DOCUMENTS

| | | | |
|---|---|---|---|
| 1,613,893 | 1/1927 | Jackson | 297/329 |
| 1,846,374 | 2/1932 | Toncray et al. | 297/329 |
| 1,957,004 | 5/1934 | Smith | 297/325 |
| 2,160,015 | 5/1939 | Haberstump | 297/325 |
| 2,181,671 | 11/1939 | Simpson et al. | 248/395 |
| 3,304,044 | 2/1967 | Campbell et al. | 297/334 |
| 3,692,270 | 9/1972 | McAuliffe | 248/384 |
| 3,880,464 | 4/1975 | Murphy et al. | 297/326 |
| 3,933,330 | 1/1976 | Gwin | 248/371 |

Primary Examiner—Marion Parsons, Jr.

[57] ABSTRACT

A folding seat assembly comprising a seat, a fold-away base for said seat and disposed under the seat, a pivoting support unit hingedly attached to a floor for rotation about a first axis, the support unit being shaped for permitting rotation of its forward side in a forward and downward direction and an upper frame adjacent the upper end of said support unit and pivotally attached thereto for pivoting about a second axis disposed upwardly and rearwardly from said first axis, the upper frame having legs at its rearward portion, and means attaching the underside of said seat to the upper side of said upper frame, whereby the upper frame and the support unit can tilt upwardly and forwardly together about the first axis and then the upper frame can move forwardly while pivoting about the second axis as the support unit rotates also about said first axis, the support unit having a stop means on it engageable by part of the attachment assembly so that when the rearward end of the seat or attachment assembly is raised upwardly the presence of the stop means will cause the support unit to rotate about the first axis in a direction such that the second axis will be caused to move laterally of itself upwardly and forwardly and whereby after the second axis is disposed above the first axis, then a shoving forward on the seat or the attachment assembly will cause the support unit to rotate further, causing the second axis to move forwardly and downwardly.

6 Claims, 5 Drawing Figures

FOLDING SEAT ASSEMBLY

FIELD OF THE INVENTION

This invention is in the field of seats having bases allowing said seats to move from a position of obstruction of a passageway to a position permitting free passage through the passageway.

DESCRIPTION OF THE PRIOR ART

It has long been a popular practice to convert the many thousands of school buses that have been retired from the heavy service into camping vehicles. Such conversions have involved rearranging the interiors of the buses by removing the seats. However, there has been no right side front seat in said buses, because when used as a school bus this area must be clear at all times for entry and for safe exit in an emergency.

One of the great disadvantages of campers made from school buses has been that when a man and his wife are on vacation it is impossible for the wife to sit in a seat next to her husband since there is no seat there. To simply mount a seat there of the usual type would also be impractical because it would be right in the way of the main route of access into the vehicle.

No solutions to this problem have been proposed to my knowledge and road noises are such that the ride is a lonesome one since conversation is not adequate from a rear area to the driver in his seat, as it would be if conversation could be as in an ordinary passenger car between the two front seats. I am aware of a certain U.S. Pat. No. 1,613,893 issued Jan. 11, 1927 to C. W. Jackson; titled "Moveable Seat for Automobiles and the Like." and also that this seat is intended to be moved forward by the rotation upwardly and forwardly of a second axis with respect to a first axis at the floor. However, in the patent this was to be accomplished by an elongated bulky and costly level that would be a nuisance and in the way at other times. It is an objective of my invention to accomplish a more effective storage with the operator doing simple and easy motions without the use of any lever at all, and further without any parts extending on the floor itself an excessive distance forward of the seat at floor level and, therefore, in a position to be interfering with the positions of the feet of an occupant of the seat.

It is an object of this invention to accomplish these storage motions by a simple lifting of the rearward end of the seat as a first step, followed by a simple forward shoving of the seat as a second step, made possible by having a stop means on the support unit cooperative with means on the attachment assembly, making all this possible without a lever, such stop means being absent in the Jackson patent.

SUMMARY OF THE INVENTION

A main object of this invention is to provide a foldaway base for supporting a seat, said base comprising a pivoting support unit hingedly attached to a floor and rotatable about the horizontal first axis on its forward side and at the floor while an upper frame pivoted to the top of the rearward side of the support unit rotates about a second horizontal axis so that with the upper frame supporting the seat the upper frame can move forwardly as the support unit pivots upwardly and forwardly and then the support unit can pivot upwardly about the second axis independently of and with respect to the support unit, said pivoting support unit being provided with a stop means thereon engageable by a portion of the upper frame or attachment assembly, whereby the described motions can be caused to occur by a first lifting of the rearward end of the seat or its attachment assembly, followed by a forward shoving on the seat or its attachment assembly for causing a rotating of the support unit to facilitate the placing of the seat in a forward position.

A further object is to provide the support unit with a shape permitting it to rotate through greater than 90° before the upper end of its forward side strikes the floor so as to dispose the seat as far forward as possible before the seat is further tilted with respect to the support unit.

Another object is to provide an automatic hook assembly having a hook attached to leg portions of the upper frame and hooking about a retainer fastened to the floor so as to firmly hold the seat and seat assembly in a riding position for road travel.

Still another object is to provide the folding seat assembly described in combination with a school bus type of vehicle in which the seat is disposed on the right front front part of the passanger compartment directly inwardly from the right front door.

A still further object is to provide the seat assembly as described used directly inwardly from the door of any one of those types of vehicles that have a door substantially mid-way between the ends thereof.

DESCRIPTION OF THE PREFERRED EMBODIMENT

Figure 1:
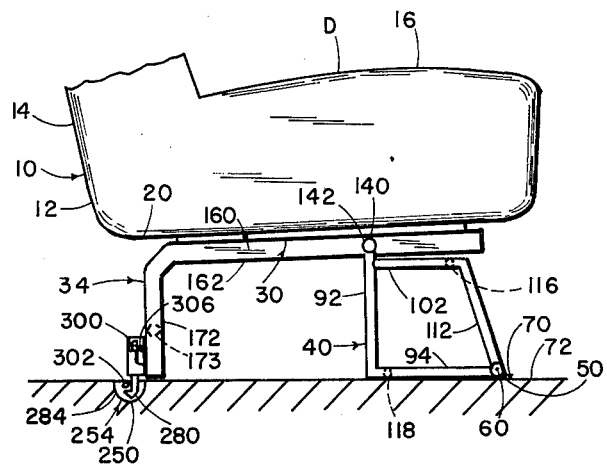
FIG. 1 is a side elevation of the seat system of this invention with the upper part of the seat removed, and with the seat system shown in a position used while a vehicle in which the seat is mounted is being driven. A portion of the housing of a hooking assembly is broken away for showing the interior.

The seat system of this invention is generally indicated at 10 in FIG. 1, and comprises a seat 12, having a back 14 and a horizontal seat portion 16, having an under surface 20, attached by a suitable attachment assembly 30 to a seat base, generally indicated at 34, of this invention.

Attachment assemblies 30 are common in the seat field, sometimes they are adjustable, and sometimes not.

The seat base 34 has a unique characteristic of two separate pivots, as indicated in the diagram of FIG. 1. There is a pivoting support unit 40 or support truss generally indicated at 40, pivotally connected by a hinge assembly 50 for rotation about a first axis 60, the hinge assembly having floor mountings 70 attached to the floor 72 so that the unit 40 can rotate in the direction of the arrows of FIG. 1.

The unit 40 has right and left spaced rear posts 92 extending substantially vertically upwardly from right and left horizontal lower braces 94, respectively, to which they are attached, the posts 92 supporting the rearward ends of right and left top connectors 102, which latter extend forwardly and horizontally to where they are connected to the upper ends of rearwardly inclining right and left front posts 112, which latter slant forwardly and downwardly therefrom to the hinge assembly 50.

The truss 40 has three different horizontally extending interconnectors extending from right to left including a top interconnector or stop member 116, which extends horizontally from right to left in parallelism with the axis 60 between the forward end of the right top connector 102 and the forward end of the left top connector 102. A second interconnector is the carrier or rear interconnector 118 which is also parallel with the axis 60 and is horizontal, and extends between rearward end portions of the lower braces 94, but being connected to the braces 94 a short distance forwardly of the rearward ends thereof for a purpose later described.

The third interconnector is an axle 120 of the hinge assembly 50, and it is also parallel with the axis 60 and extends through the floor mountings 70 in a pivoting fashion, and is secured in sleeves 122 which latter are attached to and interconnect the lower end of the left front post 112 with the forward end of the left lower brace 94, and interconnect the lower end of the right front post 112 with the forward end of the right lower brace 94.

Figure 5:
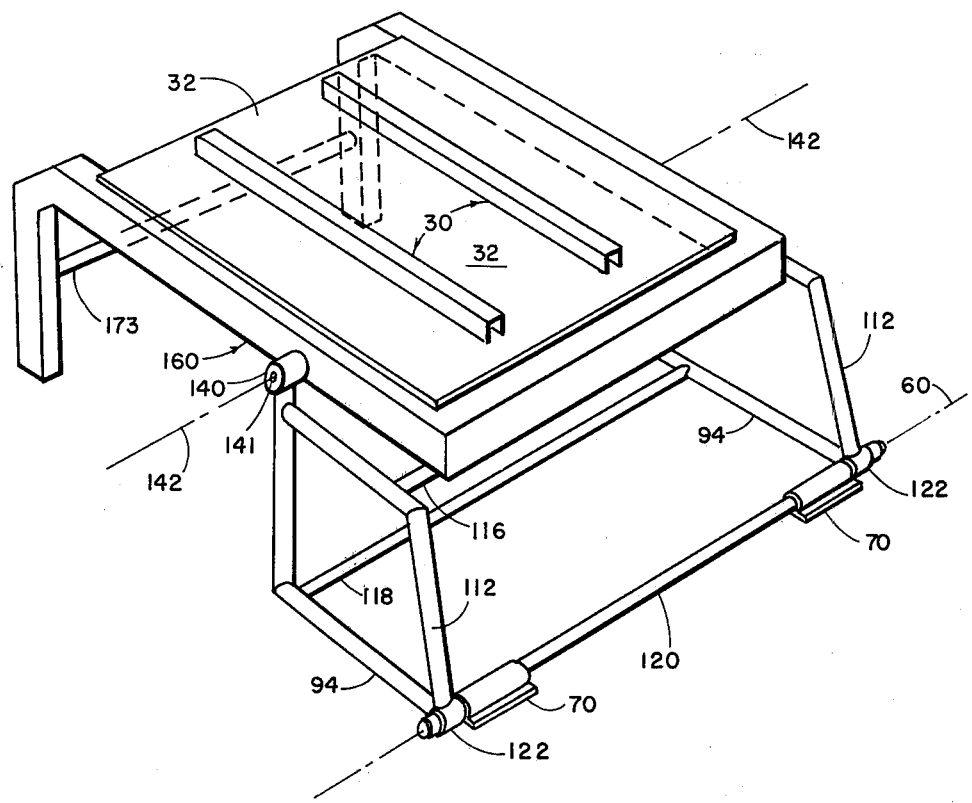
FIG. 5 is a perspective view showing the upper support frame, rearward legs and pivoting supporting unit of the invention hereof, with certain parts being shown in dotted lines, all parts being shown in the position in which they are when the seat is in use position.

At the top of each rear post 92 of the support unit 40 is a collar 140 fixed thereto receiving a pivot pin 141 defining a second axis of pivoting 142. Only the right collar and pin 140 and 141 are shown in FIG. 5, but it is to be understood that the left hand side of the seat system of this invention is identical in appearance to the right hand side thereof. The terms right and left refer to the way right and left are used in a motor vehicle by a driver facing forwardly.

The collars 140 are fixed to the right and left sides of an upper frame 160, which latter is generally horizontally and extends with its forward end across the top of the support unit 40 and with its rearward end extending a substantial distance rearwardly from the axis 142 where the rearward end of the support frame 160 is supported by downwardly extending attached rear legs 172 interconnected by a horizontal bar 173, as best seen in FIG. 5.

Referring now to FIG. 1, the floor 72 has a recess 250 in it which forms part of a locking assembly 254, having as another part a hook 280, the lower end of which is received in the recess 250 and the upper end of which is pivotally mounted on the rearward side of a rearward leg 172 by any suitable means, such as a housing 300, having a pivot pin 204 through it, on which the upper end of the hook 280 pivots about a horizontal axis parallel with the first axis 60, the hook 280 being urged rearwardly at its lower end by a spring 306 disposed on the forward side of the hook 280 and bearing against the leg 172.

A motor vehicle and seat assembly is shown at 400 in FIG. 1 and comprises a school bus 402 having a right front entry opening at 408 directly inwardly from which latter the seat system 10 of this invention is mounted on the floor 72, full lines showing at 12 the position of a seat at rest or riding position and in dotted lines showing the position of a seat in an intermediate position of being tilted forwardly as labeled I for intermediate.

Figure 3:
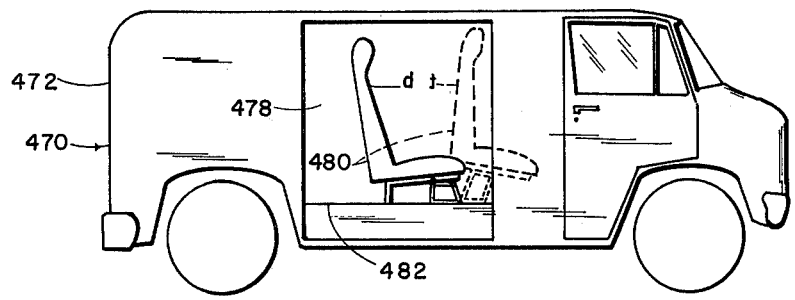
FIG. 3 is a side elevation of a motor vehicle of one of the kinds having a side door and showing the seat system of this invention mounted directly inwardly from the door and shown in full lines in a position used while the vehicle is being driven and in dotted lines in a position used when the seat system is folded.
Figure 4:
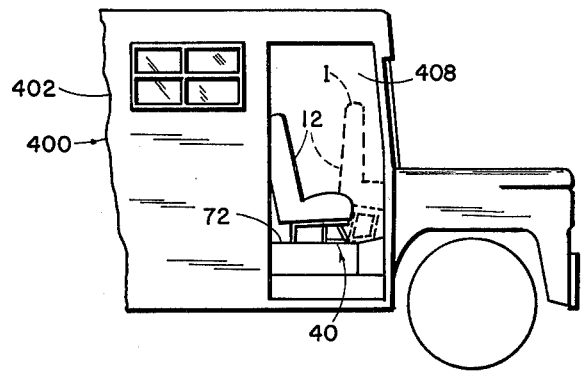
FIG. 4 is a side elevation of the forward portion of a motor vehicle of the school bus type, showing the opening at the forward end of the right side thereof directly inwardly from which the seat system of this invention is shown in full lines in position used when the motor vehicle is being driven, and shown in dotted lines in an intermediate position of folding.

Referring to FIG. 3 a motor and seat system assembly of a different nature is there shown at 470 comprising a motor vehicle 472 of the kind having a doorway opening 478 approximately midway between its ends and opening onto a floor 482, having a seat system 480 mounted thereon and shown in full lines in a driving or rest position d, a forwardly tilted position of the seat being shown at t in dotted lines. The seat system 480 of FIG. 3 is identical in description to that described above as indicated at 10 in FIG. 1.

Figure 2:
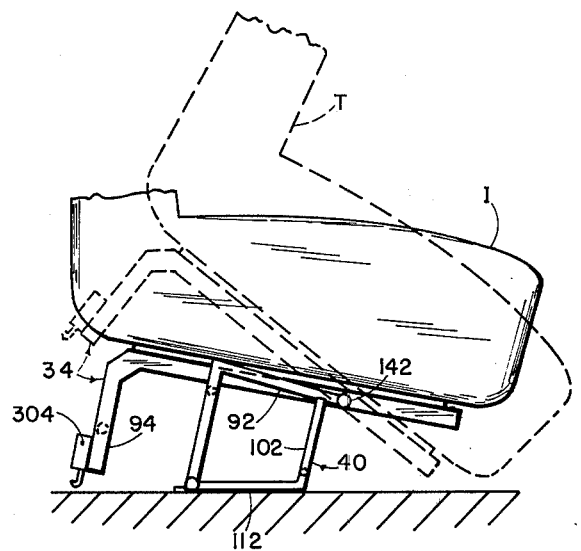
FIG. 2 is a side elevation, similar to FIG. 1, but showing the seat assembly in full lines in an intermediate position in which it is partially folded. A dotted line position of the seat assembly is also shown in FIG. 2 to illustrate the position of the seat assembly after the seat has been tilted forwardly at its upper end with respect to a support unit.

Referring now to FIG. 2, the special advantages of this new seat system are there illustrated, and in operation it will be seen that the driving position of this seat system 10 of FIG. 1 is illustrated at D in FIG. 1 but that as it is folded forward the next stage is an intermediate position, shown in full lines in FIG. 2, in which the seat is shown after two events have occurred. A fist step involved in placing the seat in storage position is to cause the rearward portion of the seat to raise up after unhooking the hook 280, such a raising continuing until a portion of the support unit 40 which is disposed forwardly of a second axis 142 and above the stop member 116 will engage the stop member 116, causing further lifting of the rearward side of the seat to cause the second axis 142 to move forwardly and laterally of itself until such time as further lifting of the rearward side of the seat is prevented by engagement of the upwardly rejecting back portion of the seat with the dashboard of the vehicle. Thereafter a forward pushing on the seat will cause the second axis 142 to continue to move forward so that it comes to be in the position shown in full lines in FIG. 2. During these motions the support unit 40 will have rotated about its axis 60 until it has assumed the position shown in full lines in FIG. 2.

Letting go of the back of the seat will then cause the attachment assembly 160 to rest on the rear inner connector or carrier 118 as will hold the seat in a desired position for being out of the way so that persons can enter the vehicle 400 by passing behind the seat. At such a time the seat will be in the full line position shown in FIG. 2.

A final stage of folding may not be necessary. Indeed, it may not even be possible in some vehicles, but the final stage of folding is accomplished by pushing forwardly on the rear of the seat 12 so as to cause its pivoting about the second axis 142 until the seat reaches the fully tilted position T, shown in FIG. 2, in which the seat is able to be out of the way to a maximum with its back 14 likely resting against the dashboard of the driver's compartment of the motor vehicle in which the seat is used. In the latter position it would be seen that a passenger can climb into a motor vehicle through its doorway without substantial obstruction from the seat system 10 and that thereafter the seat system can be replaced into driving position by a reversal of the above steps to provide a companionable place for a person to ride alongside the driver of the vehicle.

I claim:

1. A foldaway base for a seat comprising a pivoting support unit disposable above a floor, an attachment assembly for pivotally attaching said support unit to a floor and having portions attachable to said floor and said attachment assembly permitting said support unit to pivot about a horizontal first axis, an upper frame extending rearwardly from the top of said support unit, means pivotally attaching said upper frame to said support unit for rotation about a second axis parallel to said first axis and disposed upwardly and rearwardly therefrom and disposed adjacent the upper rearward portion of said support unit, and rearward leg means extending downwardly from said upper frame at a rearward part of said upper frame and adapted to engage said floor, a stop means on said support unit, means on said attachment assembly in position for engaging said stop means when the rearward end of said attachment assembly is lifted vertically so that said engagement with said stop means stops rotation of said attachment assembly about said second axis in a direction upwardly rearwardly of said second axis whereby further lifting of the rearward end of said attachment assembly after said engagement with said stop means will cause said support unit to rotate about said first axis in a direction such that said second axis will be caused to first shift laterally of itself first upwardly and forwardly to define a first shifting, and said support unit being constructed for permitting said second axis to move forwardly and downwardly after said first shifting and in response to an urging forward of said attachment assembly with respect to said first axis so that said attachment assembly reaches a desired certain storage position.

2. The foldaway base for a seat of claim 1 having a seat disposed above and attached to said upper frame.

3. The foldaway base for a seat of claim 1 having the upper end of the forward side of said support unit being disposed a substantial distance rearwardly from the lower end of the forward side of said support unit, and the area between the upper and lower portions of the forward side of said support unit being free of forwardly extending obstruction sufficiently that said support unit can freely rotate about said first axis until it is from its rest position through more than 90° of rotation.

4. The foldaway base for a seat of claim 3 having a seat disposed above and attached to said upper frame.

5. The foldaway base for a seat of claim 1 having a seat disposed above and attached to said upper frame, a motor vehicle, in combination with said base and seat, said seat being directly inwardly from a doorway of said vehicle.

6. The foldaway base for a seat of claim 1 having a carrier attached to said support unit in a position for engaging and upholding said attachment assembly when said base is in said certain storage position.

* * * * *